United States Patent
Ehlers et al.

(10) Patent No.: US 6,256,491 B1
(45) Date of Patent: Jul. 3, 2001

(54) VOICE SECURITY BETWEEN A COMPOSITE CHANNEL TELEPHONE COMMUNICATIONS LINK AND A TELEPHONE

(75) Inventors: Douglas E. Ehlers, Lincoln, NE (US); Christopher Aaron Hall, Fort Collins, CO (US); James R. Holthaus, Omaha, NE (US)

(73) Assignee: Transcript International, Inc., Lincoln, NE (US)

( * ) Notice: Subject to any disclaimer, the term of this patent is extended or adjusted under 35 U.S.C. 154(b) by 0 days.

(21) Appl. No.: 09/001,953

(22) Filed: Dec. 31, 1997

(51) Int. Cl.[7] ..................................................... H04B 1/02
(52) U.S. Cl. .......................... 455/410; 455/105; 380/275; 380/270
(58) Field of Search .................................. 380/31, 33, 34, 380/36, 37, 38, 39, 270, 275, 247, 248, 249, 253; 704/212; 455/410, 105, 225

(56) References Cited

U.S. PATENT DOCUMENTS

| | | | |
|---|---|---|---|
| 4,020,285 | * | 4/1977 | Branscome et al. ................. 179/1.5 |
| 4,167,700 | | 9/1979 | Coe et al. ............................. 325/32 |
| 4,608,456 | | 8/1986 | Paik et al. ............................ 179/1.5 |
| 4,652,699 | * | 3/1987 | Akaiwa ................................. 380/31 |
| 4,802,220 | * | 1/1989 | Marker, Jr. ............................ 380/33 |
| 4,815,128 | | 3/1989 | Malek ..................................... 380/9 |
| 4,920,567 | | 4/1990 | Malek .................................... 380/33 |
| 4,972,479 | | 11/1990 | Tobias, Jr. et al. .................... 380/33 |
| 5,113,443 | * | 5/1992 | Brockman ............................. 380/34 |
| 5,168,522 | * | 12/1992 | Simanis et al. ....................... 380/38 |
| 5,365,590 | | 11/1994 | Brame ................................... 380/49 |
| 5,410,599 | | 4/1995 | Crowley et al. ........................ 380/9 |
| 5,418,813 | * | 5/1995 | Schaffner et al. .................. 375/205 |
| 5,524,134 | | 6/1996 | Gustafson et al. ................... 379/58 |
| 5,617,476 | | 4/1997 | Ibaraki et al. ........................ 380/49 |
| 5,742,640 | * | 4/1998 | Haoui et al. ........................ 375/220 |
| 5,742,678 | * | 4/1998 | Dent et al. .............................. 380/6 |

* cited by examiner

Primary Examiner—Tod Swann
Assistant Examiner—Paul E. Callahan
(74) Attorney, Agent, or Firm—Zarley, Mckee, Thomte, Voorhees & Sease

(57) ABSTRACT

An apparatus and method for security of individual communications over a composite communications channel such as T1 or E1.

The composite channel is digitized. Individual channels are separated, but identifying information of each channel is retained. A level of security can be chosen for each channel by digitally processing the selected call with a selected level of scrambling or encryption prior to passing the call to an end-user.

24 Claims, 5 Drawing Sheets

VOICE SECURITY BETWEEN A COMPOSITE CHANNEL TELEPHONE COMMUNICATIONS LINK AND A TELEPHONE

BACKGROUND OF THE INVENTION

1. Field of the Invention

The invention relates to the security of telephone communications which utilize a composite channel telephone communications link, and in particular, to an apparatus and method to provide selectable voice security, by scrambling or encryption, of telephone calls over individual channels even though the calls travel in part over a composite communications telephone link such as T1 or E1 composite channel formats and in part over non-composite telephone communications links, including land line and cellular telephone networks, to the end point telephones.

2. Problems in the Art

Telecommunication transmission links can be either a loop, which connects a user with a serving office, or a trunk, which connects two offices. Telephone transmissions can be at voice frequency, or a number of voice-frequency channels can be multiplexed together using frequency-division techniques (analog carrier) or time-division techniques (digital carrier). The multiplexed signal can then be transmitted over guided wave media, such as wire and optical fibers, or through free space, as in radio or cellular systems.

The advantage of a multiplexed transmission is the greater economy of carrying many channels on a single medium element. One standardized digital carrier system or format is a 24-voice composite channel 1.544 Mb/s system referred to as T1. Voice channels (from a step-by-step switch, for example) are converted to digital form and multiplexed into digital groups in a primary pulse code modulation (PCM) multiplex also called a digital channel bank. This communications link can have terminals in, for example, public telephone company offices or be used at or between private company end-points.

The voice signals are converted to digital format by sampling and encoding the voice into digital words (e.g. 8 bit PCM). Each digitized voice or call is then multiplexed in synchronous fashion. Framing and signal bits are used to allow later de-multiplexing. From these individual frames, delineated by the framing bit, super frames of 12 and 24 frames are created. These super frames are used to encode additional call information. Each frame would also include all of the digitized voice for each of the 24 channels, (e.g. one frame contains twenty-four of the eight bit words which are the digital samples of the analog voice) as well as include one framing bit.

The digital information can also be encrypted if desired. It is not uncommon to do so over T1 lines. However, the digital information is usually bulk encrypted. Therefore, the security added to the communications link is without regard to the individual channels or calls. There can be no selective encryption of a call. They are all encrypted or none are encrypted.

Furthermore, such security, if even used, only exists between terminals of the T1 communications link. Ultimately, each call usually must traverse a T1 terminal and then another communications link before arriving at the end point receiving telephone set. Thus, there is generally no security level in that other link and any security in the T1 link is not helpful.

This security problem is well known. It is particularly significant because of the ever-increasing use of cellular telephones as the end point receiver. Any encryption or security in the T1 link is lost after individual calls in the link leave the T1 link. Cellular calls ultimately are transmitted in wireless fashion where anyone can intercept and listen, if they have the appropriate equipment and certain knowledge.

Some prior art has attempted to address communications security for cellular phones or radio links where the communications could be intercepted from the air. For example, U.S. Pat. No. 4,973,479 to Tobias, Jr. et al., teaches how a cellular phone with a scrambler or encryption mode could place calls to a phone without such capabilities. It uses a call diverter at, for example, a mobile telephone switching office (MTSO) to be instructed to route the scrambled or encrypted call through a scrambler/descrambler (or encrypter/decrypter). However, this does not address the problem of the security gap caused by lack of voice security after the terminal of a T1 communications link. It also requires a caller to proactively engage and instruct the diverter. U.S. Pat. No. 5,365,590 to Brame discloses a similar call diverter arrangement for radio communications.

Therefore, there is no known satisfactory solution to security problems regarding telephone calls that travel in part through a composite telephone link but in part outside the link. Furthermore, there is no known satisfactory solution to whether individual calls or channels on a composite channel can selectively be secured or unsecured.

It is therefore a primary object of the present invention to provide an apparatus and method for voice security for calls that are communicated in part through a composite digital telephone link, which improve over and solve the problems and deficiencies in the art.

Further objects, features, and advantages of the present invention include an apparatus and method as above-described which:

1. can provide scrambling or encryption security for voice telephone calls outside of the composite communications link.
2. provide flexibility and selectability as to the security level desired for each channel of the composite communications link.
3. can be transparent to the callers.
4. do not require diversion steps.
5. are economical.
6. can be used by individuals, companies, or telephone companies.
7. are non-complex.
8. provide centralized security.
9. allow secure calls to be initiated between devices equipped with equal or lower levels of security.
10. allow various levels of security while providing good recovered voice quality.

These and other objects, features and advantages of the present invention will become more apparent with reference to the accompanying specification and claims.

SUMMARY OF THE INVENTION

The present invention relates to an apparatus and method for voice security for calls that are communicated in part through a composite digital telephone link. The method includes separating out one or more calls from the composite communications link. Once separated, the call can be put into a secure form by scrambling or encryption. The call, even outside the composite communications link, is therefore secured and can proceed to an end point, where it is descrambled or decrypted. Thus, individual handling of the security can be achieved even though the call passes through the composite communications link, where all calls are handled the same way.

The apparatus according to the invention includes a device having a connection to the composite communications channel. A component recognizes and separates out each channel of the composite communications channel by recognizing the identifying information for each call that is included in the digital bit stream of the composite communications channel. A component can be selectively controlled or automatically function to secure an individual call by scrambling or encryption. An output is connectable with another communications link to provide the secured call to an end point land line or cellular phone which is operatively associated with a corresponding descrambler or decrypter.

The invention can include optional features such as control by the caller over whether the call should be secured and automatic securement by virtue of the telephone number being called or some other criteria.

DETAILED DESCRIPTION OF PREFERRED EMBODIMENTS

Overview

Figure 1:
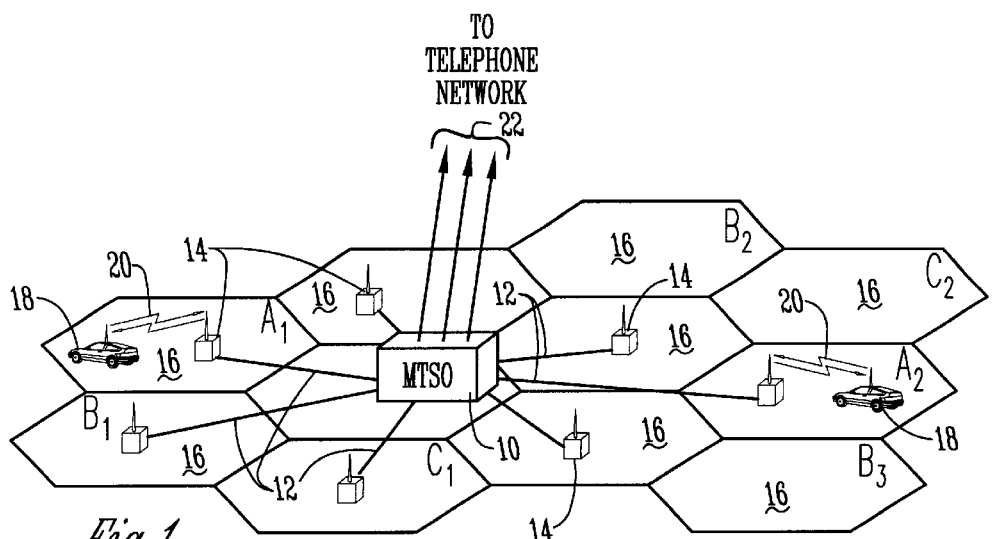
FIG. 1 is a diagrammatic depiction of a cellular telephone network that includes a T1 communications link.

To assist in a better understanding of the invention, a description of one embodiment or form the invention can take will now be set forth in detail. Frequent reference will be taken to the drawings. Reference numbers will sometimes be utilized to indicate certain parts or locations in the drawings. The same reference numbers will be used to indicate the same parts and locations throughout the drawings unless otherwise indicated.

This description will be in the context of a telephone network which includes cellular telephones. Other applications are possible.

FIG. 1 illustrates in general a cellular telephone network which includes a mobile telephone switching office (MTSO) 10 which has communications links 12 with a plurality of cell sites 14. Each cell site 14 services a cell or area 16. Cellular phones 18 in each cell 16 are linked to links 12 by radio frequency transmissions 20.

FIG. 1 also shows that MTSO 10 is connected to a conventional telephone network by communication link 22. For purposes of this description, link 22 is a T1 type link, being a composite channel link, as previously described.

Figure 2:
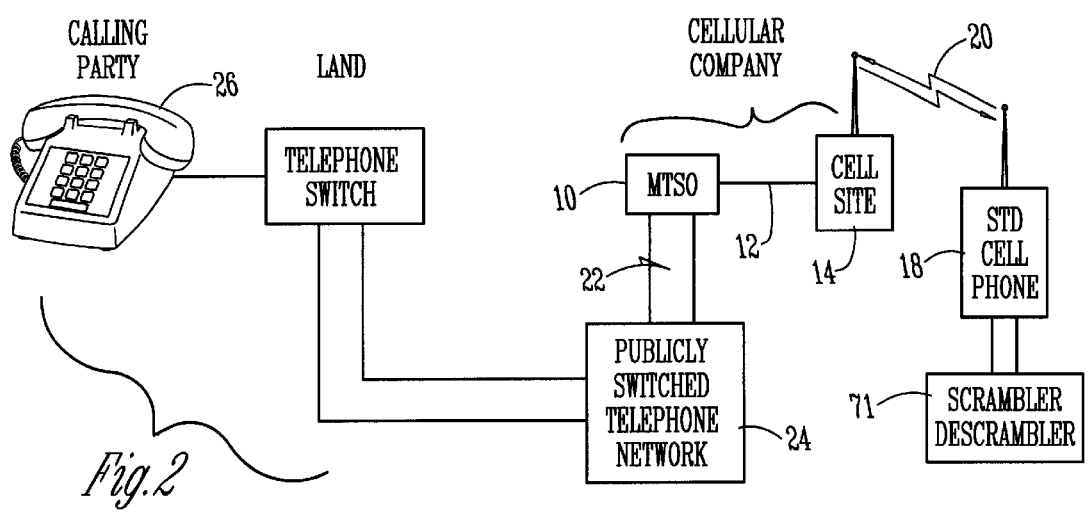
FIG. 2 is a diagrammatic depiction of a communication between telephones in a system according to FIG. 1.

FIG. 2 illustrates a conventional path for a telephone to telephone communication over the network of FIG. 1. MTSO 10 can handle a number of simultaneous calls through T1 link 22 which is connected to a public switched telephone network 24. In turn the switched network 24 relays a call from cell phone 18 to another phone 26 (here a land line phone). Thus, even though the communications through T1 link 22 may be secured by scrambling or encryption, the path between cell site 14 and cell phone 18 would not be.

Figure 3:
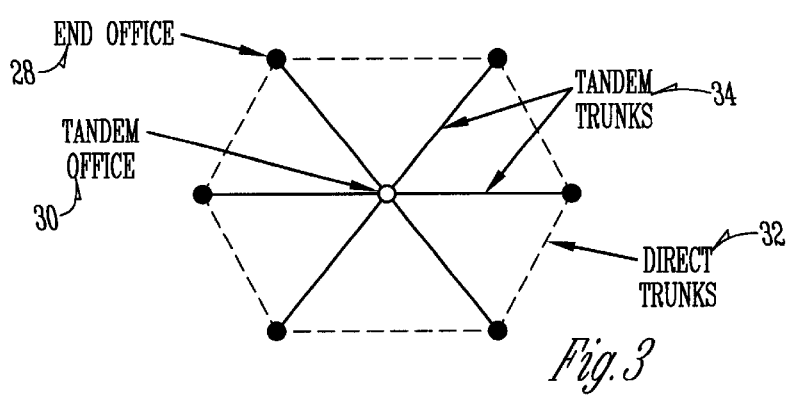
FIG. 3 is a diagram depicting a simple local telephone network.

Similar situations exist with land line telephone systems. FIG. 3 diagrammatically depicts a simple network. Even simple networks can contain switching offices 28 and tandem offices 30. Offices 28 and 30 can be connected by direct trunks 32 or tandem trunks 34. Any of the trunks can be T1 communications links, but generally the T1 link is between an MTSO, a public office switch, and/or a private branch exchange (PBX).

Figure 4:
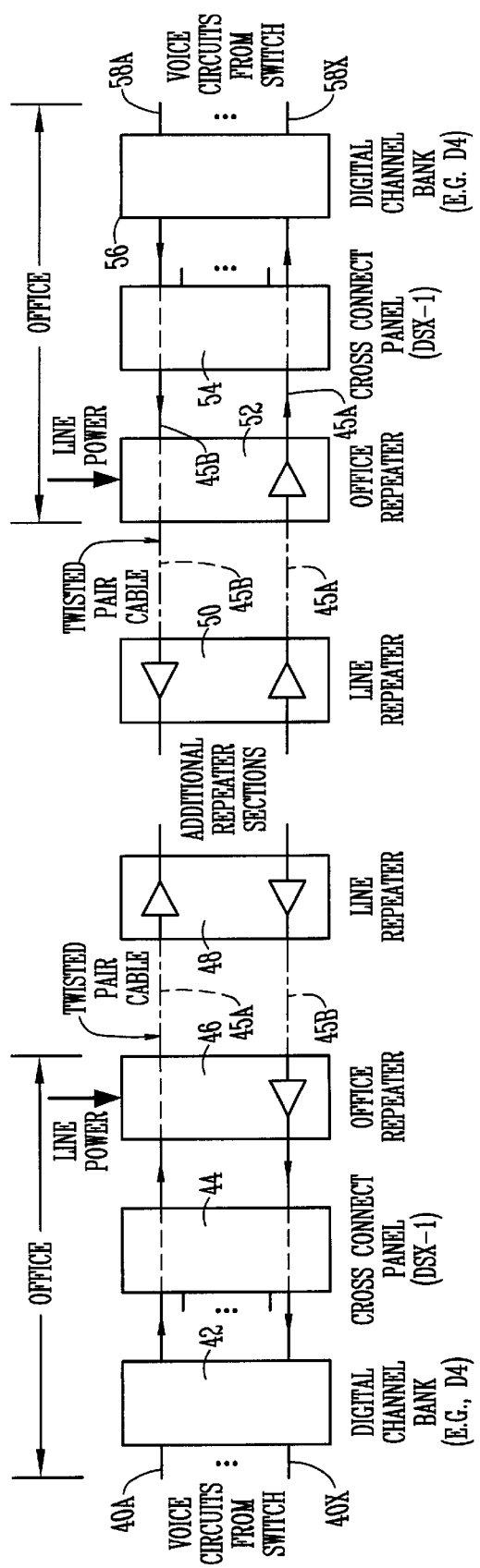
FIG. 4 is a diagrammatic depiction of a T1 communications link.

FIG. 4 illustrates the basic make-up of a T1 communications link. A plurality of voice circuits or calls 40 are converted to a digital channel bank 42. For sake of simplicity only two of the circuits 40 (40A and 40X) are explicitly shown in FIG. 4 (circuits 40B–40W are indicated by three dots). Typically there are twenty-four such circuits that comprise bank 42. Each of the calls over the twenty-four circuits are communicated over the T1 link through a twisted pair cable 45A. A second twisted pair cable 45B exists for composite channel communications in the opposite direction. An additional twisted pair cable could contain signaling information. Voice channels 40A–X (from a step-by-step switch, for example—see FIG. 4) are converted to digital form and multiplexed into 24 or 30 channel digital groups in a primary PCM (pulse code modulation) multiplex, also referred to as the digital channel bank (see reference numbers 42 and 56 in FIG. 4). If the channels are in digital form in a digital switch, the conversion between the digital format internal to the switch and the format for transmission is performed in an exchange terminal. Within a telephone company office, it is customary to bring all equipment interfaces at a given hierarchical rate together at a central digital cross-connect (see FIG. 4) to allow for convenient rearrangement of the network.

Cable 45A passes through cross-connect panel 44, office repeater 46 and line repeater 48, through additional repeater sections and through line repeater 50, office repeater 52, cross-connect panel 54 into digital channel bank 56. From there, individual calls are demultiplexed and separated out onto the plurality of voice circuits 58 and directed to individual phones or other destinations. Calls from voice circuits 58A–X traverse the T1 composite channel in the reverse direction through cable 45B.

The T1 link is duplex in the sense that, as shown in FIG. 4, one of the twisted pair (ref. no. 45A) directs the composite channels or calls in one direction, and the other wire pair (45B) directs the composite channel in the other direction between terminals (digital channel banks 42 and 56) of the link 22.

As is well known in the art, to prepare a voice signal for digital transmission, it is band-limited to about 3500 Hz and sampled at 8 Khz. Each sample is encoded into 8-bit PCM, producing a 64-kb/s signal. The signal is quantized into one of, for example, 256 levels and characterized in frames, which, as previously described, can be twenty-four 8-bit words, each word representing a sample from one of the twenty four channels, and one bit being a framing bit. Therefore, each frame would have 193 bits. The framing bit would signify the beginning (or end) of each frame, and allow a frame e to be recovered at the receiving channel bank, or by some other means, by finding a position in the received pulse stream at intervals of 193 bits.

In channel banks, the locally encoded voice signals are synchronous and appear 8 bits at a time, and are multiplexed for transmission over the composite channel. Where 64 Kb/s signals from more than one source are to be intermingled, e.g. in a digital switch, they are synchronized to a central reference which is distributed via designated digital facilities. In a digital channel bank connected to a digital switch, e.g. via a digital line, the digital switch drives the line toward the channel bank at a rate synchronous with the reference and the channel bank is loop-timed; i.e. it derives its transmit frequency from the signal it receives from the switch, which in turn is timed from the network reference. Pulse stuffing can be used along with superframes and multiframes to assure all signals that arrive at a multiplex will be synchronous and to assist in error correction. It is possible to scramble and descramble or encrypt and decrypt the information in the composite channel by means and methods well known in the art.

Figure 5:
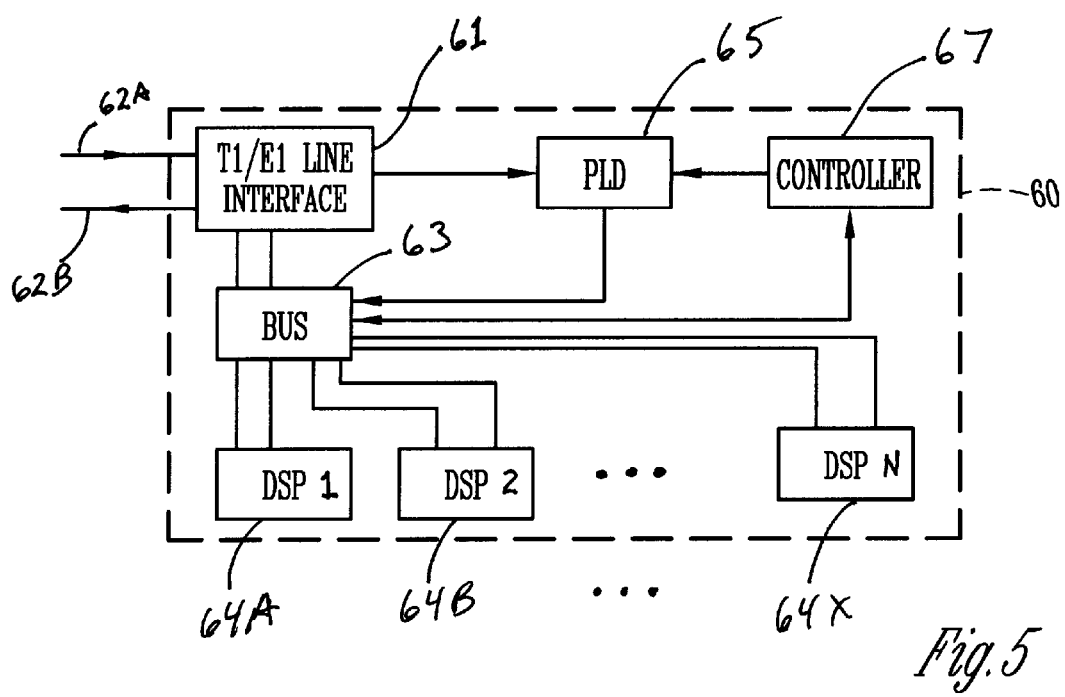
FIG. 5 is a diagrammatic depiction of an interface according to a preferred embodiment of the present invention installed with respect to the T1 communications link of FIG. 4.

FIG. 5 illustrates the addition of the preferred embodiment of the present invention to the T1 link 22. A housing 60 contains connections 62A and 62B to twisted pair cables 45A and 45B respectively near one of the terminals of the T1 link 22. Therefore, as illustrated in FIG. 5, as an example, the device in housing 60 can be connected at one end of T1 link, for example at an MTSO 10. An alternative would be a PBX at a private company. Each of the 24 possible voice circuits could then be processed by device 60. Thus, for example, a private company that wishes to have the capabilities of device 60 for its telephones or radios, could do so.

Connection 62A allows the inbound T1 digital bit stream to be pulled out of the T1 composite channel link 22. That digital inbound bit stream is separated into the discrete calls by an interface 61 that is in communication with twenty-four digital signal processors (DSPs) 64A–64X via bus 63. A programmable logic device (PLD) 65 and controller 67 cooperate with interface 61 to identify and separate out the individual calls from the composite serial bit stream through link 22, and then direct appropriate separated calls to appropriate DSPs 64. This is done by having a priori knowledge of the identifying information or framing information that is created by the T1 link to keep track of each channel, even though they are sent compositely.

Once separated into its own DSP 64, the channel can be, if desired, secured by scrambling or encryption. This can be accomplished by software in the DSP. One way to secure the calls is to use spectral rotation as disclosed in co-pending, co-owned U.S. Ser. No. 08/673,348, filed Jun. 28, 1996, which is incorporated herein by reference. A number of other scrambling techniques, well known in the art, can also be accomplished in software in the DSP. Additionally, rather than scrambling (here defined as primarily manipulating the analog content of voice), DSP's 64 can also encrypt the channel (here defined as primarily securing the digital information that can reconstruct the analog content of voice). A number of techniques for encryption are possible and widely known. An example is use of Digital Encryption Standard or DES.

After separation into discrete calls and manipulation of the content of the call in a DSP 64, if so instructed, the calls are then directed to their appropriate end destination (for example, an MTSO 10). Individual calls separated from the composite channel can thus, for example, be scrambled or encrypted prior to traversing the communications link between a terminal of the composite link 22 and MTSO 10 and thereafter a land-line or cellular telephone connection. Appropriate equipment must exist in the end destination phone to descramble or decrypt, as is obvious.

Conversely, a communication from a cellular phone 18 that traverses cellular station 14 and MTSO 10 would enter via line outbound link 22 line 62B to interface 61. If the communication were scrambled or encrypted at phone 18 by scrambler or encryptor 71, the call would be identified and separated from the digital bit stream on line 62B, and sent to an appropriate DSP 64. There the communication would be descrambled or decrypted, and then reassembled into the digital composite bit stream and placed back on line 62B so that it can traverse composite link 22 to an end destination. For example, the call from phone 18, after processing at 60, can be placed onto link 22 and pass out of digital channel bank 56 to a public switching office 28, and on to another cellular phone 18, or otherwise connect to components that connect the calls to end point telephones, including cellular phones 18.

One advantage of this arrangement is that if desired, any of the calls can be scrambled or encrypted, and thus pass to the end point phone in that state, even if the communication must traverse a cellular telephone network. The end point telephone, must of course, have a descrambler or decrypter 71 that can descramble or decrypt the scrambling or encryption that occurred in the DSP 64.

Thus FIG. 5 shows that the interface in box 60 can allow for the selective processing of any or all of the different calls that go over the T1 link 22. By separating each call, the DSPs 64 can manipulate the call as desired. The DSPs 64 can be programmed to perform such things as scrambling or encryption, or other functions on the digital information that makes up the call.

Figure 6:
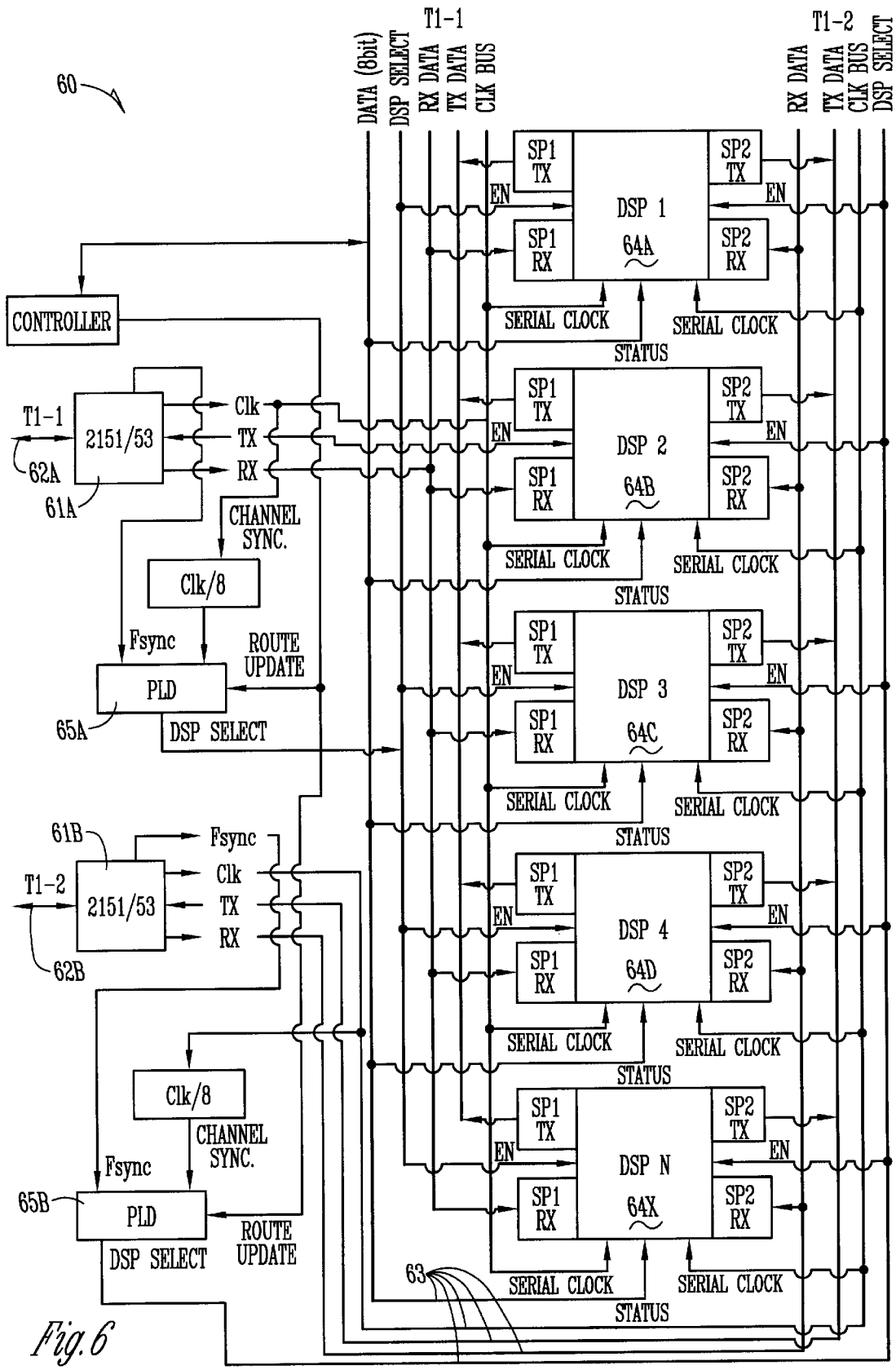
FIG. 6 is a more detailed schematic of the interface of FIG. 5.

FIG. 6 illustrates in more detail the interface of box 60 of FIG. 5. The inbound composite channel signal enters device 60 at 62A (which essentially is connected to twisted pair cable 45A of link 22), and is directed into a 2151/2153 interface 61A. Component 61A takes the analog waveform (representative of a digital channel) off the T1 link 22 and demodulates it into a digital bit stream. As stated, the bit stream is representative of the composite channel in link 22, i.e. it contains, in multiplexed form, all calls over link 22.

Component 61A also handles certain line protection and FCC issues, such as are known in the art. An example is controlling out of band signals. Component 61A also recovers a master clock signal and provides a bit clock, and also separates transmitted versus received signals. The 2151/53 block is a T1/E1 Line Interface circuit, such as are known in the art. This device converts the analog T1/E1 waveforms to a digital bit stream, and provides the frame synch (Fsync) information, which is the first bit of the 192 bit frame for T1 communications. A DS2151 device, available commercially, can be used for such an interface for T1. Similarly, a DS2153 device can be used for E1. These devices also recover the bit clock (Clk) signal for the digital bit stream. The PLD uses Fsync and Clk to derive the DSP Select signal, which is used to separate the composite channel into separate channels. The actual data bits are on the TX and RX lines. The DSP select line tells each DSP when the bits on TX and RX corresponds to its representative call.

PLD 65A essentially is a counter which finds the beginning of every frame sent over the T1 link 22. It is synchronized by the Fsync line from component 61A and utilizes clock from the Clk line from component 61A to count every 8 bits after the frame sync bit. After each 8 bits it produces a pulse. The pulse signals the next DSP 64. Therefore, on the 9th clock pulse PLD 65A sends a pulse to DSP 64B; on the 17th clock pulse PLD 65A sends a pulse to DSP 64C; and so on. These pulses every 8th bit are sent out over line DSP Select, which is a part of the bus 63 that is in communication with all DSPs 64.

The "EN" line to each DSP 64 signals the corresponding DSP 64 when the first of the serial data stream bits is coming and prepares it for receiving 8 bits which are read into the DSP. Those bits can then be processed. Then, 193 bits later, that same enable line will signal that same DSP that another 8 bits are coming to be processed. Thus, each DSP will be given the coded voice words corresponding to the same call over link 22.

2151/2153 device 61B and PLD 65B operate the same way for outbound connection 62B. 2151/2153 are switchable between T1 and E1 operation.

The invention of FIGS. 5 and 6 can work with MTSO's, public telephone switching offices, or PBX systems. It works with domestic composite communications links, such as T1, to simultaneously secure up to twenty four telephone lines, or international composite communications links, such as what is called E1, which can have up to thirty lines.

The preferred embodiment is marketed by Transcrypt International of Lincoln, Nebr., USA under the product designation VPEU II, Voice Privacy Exchange Unit II. It comprises a 19" by 5.25" by 11.5" housing with plug in connections for either T1 or E1 composite communications links. Its audio range is 300 to 3000 Hz. Supply voltage is 48 Vdc, 3 Amp.

Optionally, the device could present various levels of security for the user. For example, a first level could use frequency inversion with slowly changing codes (e.g. once a second) to offer security against casual listeners and some determined listeners. A second level uses frequency inversion but shits codes an average of twenty times per second. which protects against most determined listeners. A third level also uses frequency inversion but hops codes over 150 times per second, providing voice protection against virtually all determined listeners. Each of these methods is well known in the art.

Optionally, also, telephone users can activate voice security be entering a predetermined code through the phone keypad. The device recognizes the instruction and secures the call. Conversely, voice security can be deactivated in the same way if no such security was desired for a call.

Furthermore, the device can be programmed to recognize certain phone numbers or parts of phone numbers dialed and automatically initiate voice security or deactivate the same. This is referred to as auto-initiation.

A high security digital encryption could be used, for example Transcrypt International DME Series encryption products.

T1 format compresses data using a $\mu$-law, while E1 uses the A-law. These formats are well known in the art and are described at ITU (International Telecommunications Union), Recommendations G.703 and G.704, General Aspects of Digital Transmission Systems, and Accunet® T1.5 Service Description and Interface Specification TR62411, AT&T, Bedminster, N.J. 07921. The T1 system is also discussed in the Electronics Engineers' Handbook, D. Fink and D. Christiansen editors, McGraw-Hill Publishing Company (3rd edition) pgs. 22–45 to 22–65, which are incorporated by reference herein.

Figure 7:
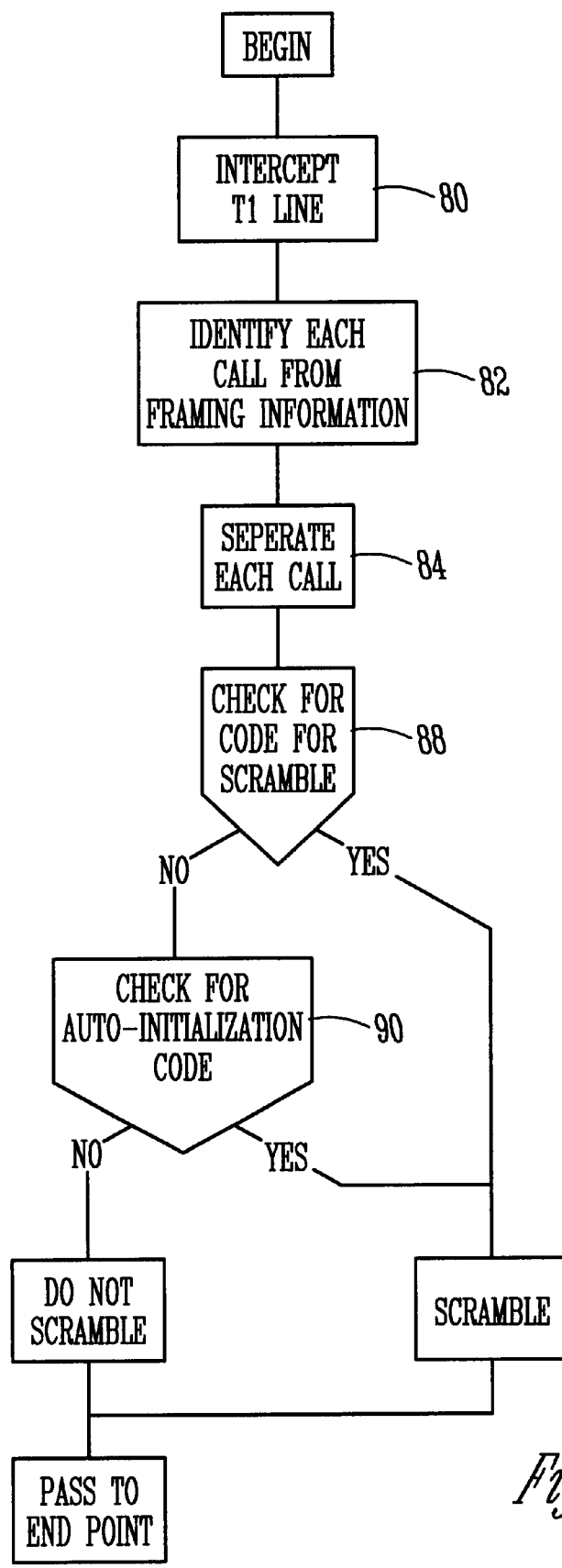
FIG. 7 is a flow chart of operation of the preferred embodiment of the present invention.

FIG. 7 sets forth a flow chart of the operation of the preferred embodiment of the invention.

A call bundled over a T1 channel is digitally coded and may be scrambled or encrypted. Framing information is created in the digital bit stream of time division multiplexing to identify the location of each channel or call.

The invention intercepts (see 80) the composite signal, identifies each call based on framing information (see 82) by separating it into its discrete parts, namely framing bits identifying each frame of information, and then the 24 words associated with each framing bit, by routing it to the plurality of DSP's 64. Each word of a frame is a part of a call; the first word a part of the first call, the last word a part of the last call. Therefore, successive parts of each call can be extracted from the same part of each successive frame of information.

Thus each call is identified and separated by knowing that the framing information identifies the beginning of parts of each of the 24 calls, and that the part of each of the 24 calls is in the same location in each frame. Thus each call is effectively separated (84) and placed into separate DSP's 64. The DSP 64 evaluates (86) the digital data and determines if there is an instruction to secure the voice (either preprogammed into the DSP or user-activated by punching a code on the user's telephone keypad) or to deactivate security (88) or whether the call is to automatically be secured (90). Then, depending on the security instruction(s), the DSP operates on the data that represents the voice, to scramble the same. This is done by converting the digital data from the T1 link to linear pulse code modulation and using the inversion or spectral rotation scrambling technique of U.S. Ser. No. 08/673,348. As previously mentioned, the strength of security can be selected by changing the rate of frequency hopping.

Thus, each call can individually be secured or not, even though it has transgressed a composite link where all calls are handled as one stream of information. Also, once leaving the device, a secured call is secured for the remainder of its path, even if put out into free space to a cellular phone.

It is to be noted that a phone without a scrambler or encrypter could call a phone and have the call secured from the device to the called phone.

It is to be understood that the voice securement could be accomplished in hardware.

Options and Alternatives

It will be appreciated that the present invention can take many forms and embodiments. The true essence and spirit of this invention are defined in the appending claims, and it is not intended that the embodiment of the invention presented herein should limit the scope thereof.

What is claimed:

1. A method of voice security for voice communications that traverse in part a composite telephone communication link that simultaneously carries multiple time division multiple access telephone calls, each call being individually identifiable by time division multiple access identifying information in the composite channel, comprising:

separating a call from the composite channel based on time division multiple access identifying information;

securing voice information in the call against unauthorized recovery of voice information.

2. The method of claim 1 wherein the step of securing the voice information comprises scrambling the voice.

3. The method of claim 2 wherein the scrambling comprises frequency inversion scrambling including a frequency hopping rate.

4. The method of claim 3 wherein the frequency hopping rate is adjustable for higher security.

5. The method of claim 1 wherein the step of scrambling comprises converting the call to linear pulse code modulation and then utilizing a frequency inversion scrambling technique.

6. The method of claim 1 wherein the step of scrambling comprises digital encryption.

7. The method of claim 1 further comprising transmitting the secured voice information to a telephone, and recovering the voice information at the telephone.

8. The method of claim 1 further comprising
selecting a level of security of a call by one of a user code or automatic recognition of information associated with the call.

9. A method of selectably securing one or more telephone calls which transverse a composite telecommunications channel link using time division multiple access comprising:

sending one or more calls through a composite telecommunications channel, the channel digitizing each call into a digital bit stream which includes digital time division multiple access information that can be used to identify the location of each call in the stream;

selecting a call from the stream;

separating the call based on said time division multiple access information;

securing the call by one of scrambling or encryption;

transmitting the scrambled or encrypted call to an end point telephone;

descrambling or decrypting the call at the end point telephone.

10. The method of claim 9 further wherein the composite channel is a T1 channel.

11. The method of claim 9 wherein the composite channel is a E1 channel.

12. The method of claim 9 wherein the composite channel carries a plurality of telephone calls in a digitally coded bit stream.

13. The method of claim 12 wherein the digital bit stream is scrambled or encrypted while in the composite channel.

14. The method of claim 1 further comprising selecting a security level of a call by a user code.

15. The method of claim 1 further comprising selecting a security level of a call by automatic recognition of information associated with the call.

16. The method of claim 15 wherein the step of automatic recognition monitors a call for a given code, and if the code is received, applies security level to the call.

17. An apparatus for selectable control of individual voice calls from composite voice calls in a composite communications channel comprising:

a housing;

a connection for electrically communicating with a composite communications channel;

an interface in communication with the connection, the interface including a component to extract, in a digital bit stream, the composite voice calls, and to identify and separate individual voice calls from the composite voice calls;

a digital signal processor for each voice call of the composite communications channel;

connectors between the interface and each digital signal processor;

software in each digital signal processor to scramble or encrypt selected separated voice calls;

an output connected to a transmission link to end point telephones.

18. The apparatus of claim 17 wherein the housing includes connections to a composite communications channel and to a telephone network.

19. The apparatus of claim 18 wherein the telephone network includes a cellular telephone network.

20. An apparatus for selectable security of a communication over a composite channel comprising:

a connection to a composite communications channel having a plurality of channels each capable of carrying a telephone call;

a DSP corresponding to each of said plurality of channels;

an interface between the connection and each DSP, including components to route a separate call of the composite channel to each DSP;

software for each DSP which selectively scrambles or encrypts a call;

an output for each DSP for connection to a communication link to an end point.

21. The apparatus of claim 20 wherein the composite channel is a T1 channel.

22. The apparatus of claim 20 wherein the composite channel is an E1 channel.

23. The apparatus of claim 20 wherein the end point is a telephone.

24. The apparatus of claim 23 wherein the telephone is a cellular telephone.

* * * * *

UNITED STATES PATENT AND TRADEMARK OFFICE
CERTIFICATE OF CORRECTION

PATENT NO. : 6,256,491 B1  Page 1 of 1
DATED : July 3, 2001
INVENTOR(S) : Ehlers et al.

It is certified that error appears in the above-identified patent and that said Letters Patent is hereby corrected as shown below:

Column 9, claim 16,
Line 38, please insert -- a -- following "applies".

Signed and Sealed this

Twenty-ninth Day of January, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,256,491 B1
DATED : July 3, 2001
INVENTOR(S) : Douglas E. Ehlers, Christopher Aaron Hall and James R. Holthaus It is certified that error appears in the above-identified patent and that said Letters Patent is hereby corrected as shown below:

<u>Title page,</u>
Item [73], Assignee, should read:
-- Transcrypt International, Inc. --

Signed and Sealed this

Fourth Day of January, 2005

JON W. DUDAS
*Director of the United States Patent and Trademark Office*